United States Patent [19]

Hess et al.

[11] Patent Number: 4,847,321

[45] Date of Patent: Jul. 11, 1989

[54] PROCESS FOR THE PRODUCTION OF THERMOSETTING ONE-COMPONENT POLYURETHANE-POLYUREA SYSTEMS

[75] Inventors: Heinrich Hess; Gerhard Grögler, both of Leverkusen; Richard Kopp, Cologne, all of Fed. Rep. of Germany; Manfred Bock, Pittsburgh, Pa.; Werner Clarenz, Bergisch Gladbach, Fed. Rep. of Germany

[73] Assignee: Bayer Aktiengesellschaft, Leverkusen, Fed. Rep. of Germany

[21] Appl. No.: 229,895

[22] Filed: Aug. 8, 1988

[30] Foreign Application Priority Data

Aug. 14, 1987 [DE] Fed. Rep. of Germany ....... 3727128

[51] Int. Cl.$^4$ .............................................. C08G 18/10
[52] U.S. Cl. .................................... 524/788; 427/384; 427/385.5; 428/402.21; 524/789; 524/791; 524/871; 528/60; 528/61
[58] Field of Search ............... 524/788, 789, 791, 871; 528/60, 61; 427/384, 385.5; 428/402.21

[56] References Cited

U.S. PATENT DOCUMENTS 4,400,497 8/1983 Blum et al. ............................ 528/45
4,483,974 11/1984 Grogler et al. ...................... 528/68

Primary Examiner—Maurice J. Welsh
Attorney, Agent, or Firm—Gene Harsh; Joseph C. Gil; Richard E. L. Henderson

[57] ABSTRACT

The present invention relates to a process for the production of storable thermosetting polyurethane-polyurea compositions wherein a storable isocyanate component stabilized by a surface coating and a polyol and/or polyamine component are separately prepared. A one-component polyurethane-polyurea reactive mixture is formed by mixing just before the intended use the separate components under mild shear forces at a temperature below the thickening temperature of the final reactive mixture.

9 Claims, No Drawings

PROCESS FOR THE PRODUCTION OF THERMOSETTING ONE-COMPONENT POLYURETHANE-POLYUREA SYSTEMS

BACKGROUND OF THE INVENTION

This invention relates to a process for the production of reactive polyurethane-polyurea systems that are stable at room temperature but which harden rapidly at elevated temperature, in which (A) a concentrated storable isocyanate preparation containing an excess of solid finely divided polyisocyanate stabilized by coating with polyadduct and a sub-stoichiometric quantity of polyols and/or polyamines and (B) a polyol and/or polyamine preparation, optionally containing mineral fillers and other auxiliaries and additives, in finely divided or dissolved form, are separately prepared and then mixed together in the stoichiometrically necessary ratio at a temperature above the melting temperature of the polyol and/or polyamine components present in the two preparations (A) and (B), but below the thickening temperature of the final reactive mixture, to form the final reactive mixture. The components may be mixed together at any time before the intended use but are advantageously mixed together just before the intended use. Reactive mixtures of this type are particularly suitable, for example, as sealing, adhesive and coating compounds, particularly in the automotive industry and for the production of industrial plastic articles.

It is known that sealing, adhesive and coating compounds of the type particularly useful in the automotive industry contain mineral fillers to obtain certain performance properties. Thus, for example, these fillers improve noise insulation: reduce flow through their viscosity-increasing and, in some cases, thixotropicizing effect: increase hardness and abrasion resistance; improve adhesion to materials, such as, for example, metals or plastics: and, not least, reduce costs.

Thus, it may even be necessary to use mineral fillers in addition to other auxiliaries and additives in the known thermosetting one-component polyurethane-urea reactive mixtures based on solid, finely divided polyisocyanates stabilized by coating with polyadduct. Cf. DE-OS No. 3,230,757 and DE-OS No. 3,112,054. For example, such reactive mixtures may be used in the automotive industry.

However, practice has shown that mineral fillers generally have a very abrasive effect so that, when incorporated in a suspension of solid polyisocyanate stabilized by coating with polyadduct (preferably polyurea), they damage the protective coating around the polyisocyanate to such an extent that the stability of the isocyanate suspension in storage is lost. The preparations which now contain filler begin to react within a few minutes or hours through simultaneously going into solution and polyaddition of the polyisocyanate with the polyol and/or polyamine component that serves as suspension medium and at the same time as reactive component. The reaction is accompanied by an increase in viscosity. The polyaddition reaction of reactive mixtures, which, although crystallized at room temperature, become liquid at moderately elevated temperature, is decelerated at room temperature by the crystalline state but is not completely prevented. The same difficulties arise when attempts are made in the reverse order to incorporate solid, powder-form polyisocyanates coated with polyurea in a filler-containing polyol and/or polyamine mixture. Even where this reverse procedure is adopted, the effect of the shear forces required for uniform suspension of the solid polyisocyanate in the presence of abrasive mineral fillers results in a loss of stability in storage through destruction of the protective polyurea coating around the polyisocyanate core. Where mild shear forces which preserve the polyurea coating around the polyisocyanate are applied, the solid to be incorporated, i.e., either the polyisocyanate or the mineral fillers, is not suspended sufficiently uniformly.

One-component polyurethane-polyurea reactive systems (hereinafter referred to in short as "polyurethanes") that are storable at room temperature but which harden under the effect of heat are already known. They consist of solid polyisocyanates stabilized by coating with polyadduct (preferably polyurea) and low molecular weight and/or relatively high molecular weight isocyanate-reactive compounds, preferably polyols and/or polyamines. Cf. DE-OS 3,112,054 and DE-OS 3,230,757. The solid polyisocyanate particles stabilized by reaction with, for example, polyamines, amidines, hydrazines or hydrazide compounds containing terminal -CO-NH-NH$_2$- groups show extremely inert behavior below the so-called thickening temperature (discussed below): above the thickening temperature, the polyaddition reaction begins to take place. The reaction components in so-called one-component PUR systems are preferably present in the correct quantitative ratio for the production of the final polyurethanes. The hardened polyurethanes are produced by heating the one-component system to the temperatures of 70° to 180° C., typically to temperatures of 100° to 130° C.

A difficulty arises where polyol and/or polyamine components that are solid at room temperature but which melt at slightly elevated temperature (20° to 80° C., more especially 30° to 60° C.) are used as suspension medium and reactive component for the production of one-component polyurethane-polyurea reactive mixtures. Solid components of the type in question are, in particular, OH- or NH$_2$-terminated polyesters and OH- or NH$_2$-terminated polyethers containing a high percentage of polyethylene oxide or polytetrahydrofuran (poly-THF). One-component polyurethane-polyurea reactive mixtures prepared with polyols and/or polyamines that are solid at room temperature must, of course, be melted before use. To ensure that the melting process is completed in a reasonable time, containers with solidified contents must be heated at a temperature distinctly above the melting temperature of the contents. However, the uppermost limit to the temperature used for melting is imposed by the so-called "thickening temperature" of the reactive mixture, which is generally only about 20° to 30° C. above the melting temperature of the polyol and/or polyamine component of the mixture. The thickening temperature is the temperature to which an isocyanate containing preparation stable in storage at room temperature may still just be briefly heated, i.e., for a few hours or less, without a polyaddition reaction occurring.

Accordingly, a container accommodating a formulated reactive mixture with reactive constituents that are largely present in solidified form at room temperature cannot be heated at an arbitrary higher ambient temperature with a view to obtaining as high a melting rate as possible. The melted isocyanate suspension would, to an increasing extent, irreversibly harden at the sides of the container and would therefore be unsuitable for further use. Accordingly, one component polyurethane reactive mixtures crystallized at room temperature cannot be melted in the short times needed in practice.

SUMMARY OF THE INVENTION

The object of the present invention is to provide a method of preparing and processing thermosetting one-component polyurethane-polyurea reactive mixtures, optionally containing mineral fillers, which do not have any of the previously discussed disadvantages of the prior art. These disadvantages include limitations imposed by the nature of the polyisocyanates preferably stabilized by coating with polyurea. First, a liquid or melted preparation containing polyisocyanate stabilized by coating must not be exposed to excessive shear forces, particularly in the presence of mineral fillers. Second, preparations to be melted must be heated only at a moderately elevated ambient temperature.

Surprisingly, this and other objects that will be apparent to those skilled in the art may be achieved by initially preparing one-component polyurethane-polyurea reactive mixtures in two parts that just before the intended use are mixed together to form the final one-component reactive mixture in the final processing step under the influence of mild shear forces which preserve the polyurea coating on the polyisocyanate grain.

DESCRIPTION OF THE INVENTION

The present invention relates to a process for the production of storable thermosetting polyurethanepolyurea compositions wherein (A) a storable isocyanate component containing an excess of solid finely divided polyisocyanate stabilized by coating with polyadduct and a substoichiometric quantity of polyols and/or polyamines and (B) a polyol and/or polyamine component, optionally containing mineral fillers and other auxiliaries and additives, are separately prepared and just before the intended use are mixed under the influence of mild shear force at a temperature between the melting temperature of the polyols and/or polyamines in (A) and (B) and the thickening temperature of the final reactive mixture to form the final one-component polyurethane-polyurea reactive mixture.

Part (A) is a paste or a suspension, which may even be present as a solidified mass at room temperature, of a solid powder-form polyisocyanate stabilized by coating with polyurea and a polyol and/or polyamine or mixture thereof. The second part (B) contains the remaining quantity of polyol and/or polyamine stoichiometrically necessary for forming a polyurethane-polyurea and, optionally, mineral fillers and other auxiliaries and additives.

The polyols and/or polyamines serving as suspension medium both for the solid polyisocyanate stabilized by a polyurea coating and for the mineral fillers and other auxiliaries and additives may be solid or liquid at room temperature. For the incorporation of polyisocyanate and filler, the polyols and/or polyamines must always be present in liquid form. Accordingly, solid polyols or polyamines must first be melted. The melting temperatures of polyol and/or polyamine components of the type typically used in polyurethane resin (PUR) technology and which are solid at room temperature are generally in the range from 20° to 80° C, preferably in the range from 30° to 60° C. Thus, the polyisocyanate preparation (A) and the filler preparation (B) may be present either as a liquid suspension or as a solidified suspension in the form of compact blocks, sheets or granulates varying widely in granulometry and grain size. Preparations (A) and (B) that are liquid at room temperature may be directly mixed together to form the final reaction mixture.

To prepare final reactive mixtures containing as the polyol or polyamine component substances that are largely solid at room temperature, both the polyisocyanate preparation (A) and the optionally filler-containing preparation (B) must be melted. A storage container accommodating component (B) in solidified form may be heated at an ambient temperature distinctly above the melting point of the polyols and/or polyamines in order to accelerate the melting process. The polyisocyanate preparation (A) cannot be heated at an arbitrary higher ambient temperature for the same reasons as explained above in regard to one-component reactive mixtures crystallized at room temperature. However, they may effectively be stirred into the molten component (B), as described in more detail below.

Dividing the starting mixture into an isocyanate component (A) and a polyol/polyamine component (B) affords the following advantages:

1. The two parts (A) and (B) may be mixed under the influence of mild shear forces in an ordinary mixer of any type (for example, a planetary mixer) to form the final reactive mixture containing uniformly distributed solid polyisocyanate and filler without the protective coating around the solid polyisocyanate being damaged by the effect of the fillers.

2. The isocyanate component (A) may be introduced, optionally in solid form, advantageously as granulate, into the completely melted component (B) at a temperature between the melting temperature of the polyol and/or polyamine components in (A) and (B) and the thickening temperature of the reactive PUR mixture to be prepared, and uniformly stirred while melting. Component (B) should be heated only enough to melt component (A) added in solid form. This procedure prevents an already formulated reactive mixture containing solid polyisocyanate from undesirably overheating during the heating process.

3. Reactive mixtures of low filler content or unfilled reactive mixtures show a marked tendency towards sedimentation of the solid isocyanate in storage. Before use, the isocyanate must be stirred up from the bottom of the storage vessel and homogeneously dispersed. Scraping off and stirring up the isocyanate from the bottom of the vessel, which involves extensive mechanical effort, can be avoided if the isocyanate is handled in batch form as a paste or granulate from the outset and is stirred into the rest of the polyol/polyamine (component (B)) only shortly (hours or a few days) before processing.

4. The entire quantity of aliphatic amine required for effective stabilization of the solid isocyanate is necessarily present in component (A). However, since according to the invention the quantity of polyamine/polyol therein is reduced in relation to the quantity stoichiometrically required for PUR formation, an increased concentration of stabilizing aliphatic amine in relation to its concentration in the final mixture is obtained. As a result, the thickening temperatures and hence the maximum permitted storage temperatures for the isocyanate batch (A) are higher by about 5° to 30° C. (generally by about 10° to 20° C.) than in the final reactive mixture. Storability problems, which occur with formulations having critically low thickening temperatures, may thus be effectively avoided.

To produce the compositions according to the invention, an isocyanate component, i.e. a granulate or a paste, containing a molar deficit of the NCO-reactive suspension medium (relative to the solid finely divided stabilized polyisocyanate) is prepared as component (A). The extent of this molar deficit is not subject to any direct constraint and is calculated from the molecular weights and mass ratios of the components used in each particular case. The mass ratios are related to the volume ratios by the specific gravities. An upper limit is ultimately imposed on the volume ratio of solid polyisocyanate to suspension medium by physical factors, while a lower limit is imposed solely by the wishes of the processor. If the maximum volume ratio is exceeded, air-filled voids are left between the solid particles so that only friable mixtures are obtained. The isocyanate content and hence the consistency of the isocyanate batch are determined by the particular technical circumstances and by the wishes of the processor. Where the volume ratio of isocyanate to suspension medium falls below a value which is not too far removed from the stoichiometrically correct composition for PUR formation, the essence of the invention, namely dividing the starting mixture into an isocyanate batch and the rest of the polyol/polyamine, is no longer satisfied. The equivalent ratio of polyol/polyamine to isocyanate in the isocyanate batch (A) may be between 0.05 and 0.95. This ratio cannot be defined any more closely because of the factors mentioned above.

Component (B) provides the remaining quantity of NCO-reactive substances stoichiometrically necessary for polyurethane formation, so that an isocyanate index i.e. the ratio of NCO equivalents to equivalents of NCO-reactive substances multiplied by 100) of from 50 to 200, preferably from 90 to 135, is obtained. The desired fillers and other auxiliaries and additives are optionally incorporated in component (B). Any of the mixing units normally used in dispersion technology may be used for this purpose. The stability of the protective coating around the solid isocyanate is unlikely to be affected because the solid isocyanate is, of course, separately present in component (A), at least until the dispersion of (B) is completed.

Preferred compositions are those in which isocyanates and amines or polyols are present in such quantities that an index of 50 to 200, preferably of 90 to 135, is maintained.

Suitable solid polyisocyanates are those which have a melting point above 40° C, preferably above 80° C., for example, 1,5-naphthalenediisocyanate, dimeric 4,4'-diisocyanatodiphenylmethane, dimeric 2,4-diisocyanatotoluene, 3,3'-diisocyanato-4,4'-dimethyl-N,N'-diphenylurea and N,N'-bis[4-(4- or 2-isocyanatophenylmethyl)phenyl]urea. Dimeric 2,4-diisocyanatotoluene and 3,3'-diisocyanto-4,4'-dimethyl-N,N'-diphenylurea are particularly preferred.

The polyisocyanates are "deactivated"(stabilized) preferably by the action of aliphatic polyamines having molecular weights of 32 to 399 and optionally by the action of aliphatic polyamines having molecular weights of from 400 to 8000. Examples of such polyamines are ethylenediamine, 1-amino-3,3,5-trimethyl-5-aminomethylcyclohexane, 3,3'-dimethyl-4,4'-diaminodicyclohexylmethane, diethylenetriamine, methylnonanediamine.

Other suitable stabilizers are, for example, hydrazine, generally in the form of hydrazine hydrate; $C_1-C_6$alkyl-substituted hydrazines, for example methyl hydrazine, ethyl hydrazine, hydroxyethyl hydrazine or N,N'-dimethyl hydrazine: and hydrazide-terminated compounds, such as for example carbodihydrazide, ethylene-biscarbazinic ester, β-semicarbazidopropionic acid hydrazide or isophorone-bissemicarbazide. Other deactivating agents are listed in DE-OS Nos. 3,230,757 and 3,112,054.

Other suitable stabilizers for the isocyanate component are open-chain, monocyclic, or bicyclic amidines or guanidines which do not contain isocyanate-reactive hydrogen atoms. Examples of such compounds are tetramethylguanidine, pentamethylguanidine, 1,2-dimethyltetrahydropyrimidine, 1,8-diazabicyclo[5.4.0]undec-7-ene, 1,5-diazabicyclo[4.3.0]non-5-ene. Further examples of such amidines can be found in DE No.3,403,500.

The NCO-reactive suspension medium used for the solid stabilized polyisocyanates may be, for example, a liquid or low-melting (<80° C., preferably <60° C.), low molecular weight and/or relatively high molecular weight polyol and/or polyamine.

Suitable relatively high molecular weight polyols having a molecular weight of from 400 to 10,000 are polyesters, polyethers, polythioethers, polyacetals, polycarbonates and polyester amides containing at least 2, preferably 2 to 4, hydroxyl groups and generally having a molecular weight of from 4 to 88, of the type known per se for the production of homogeneous and cellular polyurethanes. Examples of these polyols can be found, for example, in DE-OS No. 2,920,501, DE-0S No. 2,854,384 and DE-OS No. 3,230,757.

Polyhydroxyl compounds already containing urethane or urea groups and optionally modified natural polyols, such as castor oil, carbohydrates or starch, may also be used. Adducts of alkylene oxides with phenol-formaldehyde resins or with rear-formaldehyde resins may also be used in the process according to the invention.

Hydroxyl-terminated polybutadienes are also suitable for the purposes of the invention because they give particularly elastic and hydrolysis-stable products. It is also possible to use polyhydroxyl compounds containing high molecular weight polyadducts or polycondensates or polymers in finely disperse or even dissolved form.

Polyadduct-containing polyhydroxyl compounds are obtained by allowing polyaddition reactions (for example, reactions between polyisocyanates and amino functional compounds) or polycondensation reactions (for example, between formaldehyde and phenols and/or amines) to take place in situ in the above-mentioned compounds containing hydroxyl groups.

Polyhydroxyl compounds modified by vinyl polymers, of the type obtained, for example, by polymerization of styrene or acrylonitrile in the presence of polyethers or polycarbonate polyols, are also suitable for the process according to the invention.

Representatives of these compounds suitable for use in accordance with the invention are described, for example, in *High Polymers*, XVI, "Polyurethanes, Chemistry and Technology", edited by Saunders-Frisch, Interscience Publishers, New York, London, Vol. I, 1962, pages 32–42 and pages 44 and 54, and Vol. II, 1964, pages 5–6 and 198–199; Kunststoff-Handbuch, Vol. VII, Vieweg-Hochtlen, Carl-Hanser-Verlag, Munchen, 1966, for example on pages 45 to 71; and DE-OS Nos. 2,854,384 and 2,920,501.

Other suitable polyols are polymers containing hydroxyl groups, for example, copolymers of olefinically unsaturated monomers and olefinically unsaturated monomers containing active hydrogen. Such compounds are described, for example, in EP-A No.62,780, page 5 and the Examples. They are preferably used for sealing compounds, filling compounds, adhesive compounds or undersealing compounds.

It is of course possible to use mixtures of the above-mentioned compounds containing at least two isocyanate-reactive hydrogen atoms, for example, mixtures of polyethers and polyesters.

Low molecular weight chain-extending agents or cross-linking agents may also be used as the polyols optionally present in the suspensions. These chain-extending or cross-linking agents are preferably at least difunctional compounds containing hydroxyl groups attached to aliphatic and/or cycloaliphatic groups and having molecular weights of from 62 to 399. Low molecular weight diols containing hydroxyl groups attached to aliphatic or cycloaliphatic groups and having a molecular weight of from 62 to 399 are preferred.

These compounds generally contain 2 to 8, preferably 2 to 4 and more preferably 2, hydroxyl groups. Mixtures of various compounds may of course also be used. Examples of such compounds include ethylene glycol, diethylene glycol, triethylene glycol, tetraethylene glycol, trimethylene glycol, butane-2,3- and/or -1,4-diol, pentane-1,5-diol, hexane-1,6-diol, neopentyl glycol, 1,4-bis(hydroxyethyl)-cyclohexane, 1,4-dihydroxycyclohexane, terephthalic acid bis($\beta$-hydroxyethyl) ester, 1,4,3,6-dianhydrohexitols, 1,4-monoanhydrotetritols, propylene glycol, dipropylene glycol, tripropylene glycol, tetrapropylene glycol, bis(2-hydroxyethyl)hydroquinone, bis(2-hydroxyethyl)-resorcinol. Suitable polyfunctional compounds are trimethylolpropane, trimethylolethane, hexane-1,2,6-triol, glycerol, pentaerythritol, quinitol, mannitol, sorbitol, castor oil and also formose or formitol.

Diols or polyols containing tertiary amines, for example N-methyldiethanolamine, triethanolamine or N,N'-bis(hydroxyethyl)piperazine, are also suitable.

It is also possible to use diols containing additional groups, for example, adipic acid bis(2-hydroxyethyl) ester, terephthalic acid bis(2-hydroxyethyl) ester, diol urethanes, diol ureas or polyols containing sulfonate and/or phosphonate groups, for example, 1,6-hexamethylene-bis(2-hydroxyethylurethane), 4,4'-diphenylmethane-bis(2-hydroxyethylurea) or the adduct of sodium bisulfite with butane-1,4-diol or alkoxylation products thereof. Other low molecular weight compounds are described in detail in DE-A No. 2,854,384.

The above-mentioned low molecular weight and relatively high molecular weight polyols may optionally be modified by preliminary reaction with a substoichiometric quantity of a polyisocyanate. Polyisocyanates suitable for this purpose are aliphatic, cycloaliphatic, araliphatic, aromatic and/or heterocyclic polyisocyanates of the type described, for example, in DE-OS No. 2,920,501 (pages 12 to 16).

In general, it is particularly preferred to use the commercially readily obtainable polyisocyanates, for example, 2,4- and 2,6-tolylene diisocyanate and mixtures of these isomers ("TDI"), polyphenyl-polymethylene polyisocyanates of the type obtained by phosgenation of aniline-formaldehyde condensates ("crude MDI"), 4,4'- and/or 2,4'-diphenylmethane diisocyanate, 1,6-hexamethylene diisocyanate, 1-isocyanato-3,3,5-trimethyl-5-isocyanatomethylcyclohexane, perhydro-2,4'- and/or 4,4'-diphenylmethane diisocyanate.

Liquid or low-melting ($<80°$ C., preferably $<60°$ C.), low molecular weight and/or relatively high molecular weight, aromatic and/or aliphatic polyamines may also be used as the NCO-reactive suspension medium for the solid, stabilized polyisocyanates. Relatively high molecular weight aliphatic and/or relatively high or low molecular weight aromatic polyamines are preferred. Low molecular weight aliphatic polyamines are preferably present therein as stabilizers, but at most in small quantities. Relatively large quantities of free low molecular weight aliphatic polyamines would result in overstabilization. Only low molecular weight aliphatic polyamines that are chemically bound in the form of polyureas may be present in relatively large quantities.

Suitable relatively high molecular weight polyamino compounds containing aromatic amino groups and having a molecular weight in the range from 400 to 8000 are preferably polyamine compounds of the type obtained by hydrolysis (preferably basic hydrolysis) of corresponding NCO prepolymers based on relatively high molecular weight polyhydroxyl compounds and excess aromatic diisocyanates. Examples of this process can be found in DE-OS Nos. 2,948,419, 3,039,600, 3,112,118, EP-A- Nos. 61,627, 71,132, and 71,139. Other known processes for the production of aromatic amino compounds of relatively high molecular weight are also described in DE-OS No. 2,948,419. The process according to DE-OS No. 2,948,419 and the other patent specifications cited are preferably used for the production of polyether polyamines, although they may also be used for the production f polyester, polyacetal, polythioether or polycaprolactone polyamines. Preferred polyamines include difunctional or trifunctional polyamines which contain urethane groups (from the reaction of the corresponding relatively high molecular weight polyhydroxyl compounds with the excess polyisocyanates) and which bear amino groups at the residue of the (former) polyisocyanate. However, the relatively high molecular weight aromatic polyamines may also be produced by other methods, for example, by reaction of NCO prepolymers with excess quantities of hydrazine, aminophenylethylamine or other diamines in accordance with DE-AS No. 1,694,152. French Pat. No. 1,415,317 describes another synthesis in which the NCO prepolymers are converted with formic acid into the N-formyl derivatives which are then hydrolyzed. The reaction of NCO prepolymers with sulfamic acid in accordance with DE-AS No. 1,155,907 also leads to relatively high molecular weight polyamines.

Suitable relatively high molecular weight polyamino compounds containing aliphatic amino groups and having a molecular weight of from 400 to 8000 (preferably from 1000 to 4000) include, for example, those of the type obtained by reductive amination of polyoxyalkylene glycols with ammonia in accordance with Belgian Patent No. 634,741 and U.S. Pat. No. 3,654,370. Other relatively high molecular weight polyoxyalkylene polyamines may be prepared by known methods of the type listed in the company publication "Jeffamine, Polyoxypropylene Amines" of Texaco Chemical Co., 1978. Such methods include, for example, hydrogenation of cyanoethylated polyoxypropylene glycols (DE-OS No. 1,193,671), amination of polypropylene glycol sulfonic acid esters (U.S. Pat. No. 3,236,895), treatment of a polyoxyalkylene glycol with epichlorohydrin and a primary amine (French Patent No. 1,466,708), or reaction of NCO-prepolymers with hydroxyl-containing enamines, aldimines or ketimines and subsequent hydrolysis in accordance with DE-OS No. 2,546,536. Other suitable relatively high molecular weight aliphatic diamines and polyamines include polyamines obtainable in accordance with DE-OS No. 2,948,419, DE-OS No. 3,039,600, DE-OS No. 3,112,118, EP-A No. 61,627, EP-A No. 71,132, and EP-A No. 71,139 by alkaline hydrolysis of NCO prepolymers (with aliphatic diisocyanates) using bases. The process according to the DE-OS No. 2,948,419 and the other references is preferably used for the production of polyether polyamines, although it may also be used for the production of polyester, polyacetals, polythioether or polycaprolactone polyamines. Preferred polyamines include difunctional or trifunctional polyamines which contain urethane groups (from the reaction of the corresponding relatively high molecular weight polyhydroxyl compounds with the excess polyisocyanates) and which bear the amino groups at the residue of the (former) polyisocyanate. However, the relatively high molecular weight aliphatic polyamines may also be obtained by other methods, for example, by reaction of NCO prepolymers with excess quantities of diamines in accordance with DE-AS No. 1,694,152. French Patent No. 1,415,317 describes another synthesis method in which NCO prepolymers are converted with formic acid into the N-formyl derivatives which are then hydrolyzed. These relatively high molecular weight aliphatic polyamines may be used both as stabilizers for the polyisocyanate component and as a further component serving as suspension medium.

Low molecular weight aromatic diamines having a molecular weight in the range from 108 to 399 may be used a chain-extending agents. Aromatic polyamines are also understood to include amines in which the amino group is attached to heterocyclic radicals of aromatic character. Suitable aromatic polyamines are, for example, p-phenylenediamine; 2,4- and/or 2,6-tolylenediamines; diphenylmethane-4,4'- and/or -2,4'- and/or-2,2'-diamines; 3,3'-dichloro-4,4'-diaminodiphenylmethane: 3-[$C_1$-$C_8$ alkyl]-4,4'-diaminodiphenylmethane; 3,3'-di($C_1$-$C_4$ alkyl)-4,4'-diaminodiphenylmethane and 3,3',5,5'-tetra($C_1$-$C_4$ alkyl)-4,4'-diaminodiphenylmethanes; 4,4'-diaminodiphenyl sulfides, sulfoxides or sulfones; diamines containing ether groups according to DE-A Nos.1,770,525 and 1,809,172 (believed to correspond to U.S. Pat. Nos. 3,654,364 and 3,736,295); 2-halogen-1,3-phenylenediamines optionally substituted in the 5-position (DE-A Nos. 2,001,772, 2,025,896 and 2,065,869); bisanthranilic acid esters (DE-A No. 2,040,644 and 2,160,590): 2,4-diaminobenzoic acid esters according to DE-A No. 2,025,900: and tolylene diamines substituted by one or two ($C_1$-$C_4$ alkyl) groups. Particular preference is attributed to 3,5-diethyl-2,4- and/or 2,6-diaminotoluene (particularly their technical (80/20) or (65/35) isomer mixtures): asymmetrically tetraalkyl-substituted diaminodiphenylmethanes, for example, 3,5-diethyl-3',5'-diisopropyl-4, 4'-diaminodiphenylmethane and isomer mixtures thereof according to DE-A No. 2,902,090: 4'-diaminobenzanilide and 3,5-diaminobenzoic acid ($C_1$-$C_4$-alkyl)ester: 4,4'- and/or 2,4'-diaminodiphenylmethane; and naphthylene-1,5-diamine.

It is of course possible to use mixtures of the abovementioned polyhydroxyl compounds and polyamino compounds.

The catalysts in question are, for example, tertiary amines, such as triethylamine, tributylamine, N,N,N',N'-tetramethylethylenediamine, 1,4-diazabicyclo [2.2.2]octane, N,N-dimethylbenzylamine, and N,N-dimethyl-cyclohexaneamine.

Suitable metal compounds are organometallic compounds, more especially organotin compound and organolead compounds. Preferred organotin compounds are tin(II) salts of carboxylic acids, such as tin(II) ethylhexanoate and tin(II) stearate, and the dialkyltin salts of carboxylic acids, such as, for example, dibutyltin dilaurate or dioctyltin diacetate. Preferred organolead compounds are lead(II) salts of carboxylic acids, such as lead(II) naphthenate, lead(II) ethylhexanoate, lead(II) stearate, and also, for example, lead(II) bis(diethyldithiocarbamate).

Further representatives of catalysts suitable for use in accordance with the invention and information on the way in which the catalysts work can be found in *Kunststoff-Handbuch,* Vol. VII, edited by Vieweg and Hochtlen, Carl-Hanser-Verlag, Munchen 1966, for example on pages 96 to 102, and in DE-A No. 3,230,757.

The catalysts are generally used in a quantity of from about 0.001 to 10% by weight, based on the composition as a whole.

Examples of auxiliaries and additives which may optionally be present include dyes or pigments, fillers (such as heavy spar, chalk, zeolites, quartz powder, kieselguhr, silica gel, gypsum, talcum, active carbon black and metal powders), UV absorbers or stabilizers (such as phenolic antioxidants), light stabilizers, blowing agents, surface-active additives (such as emulsifiers or foam stabilizers), optional cell regulators, antiblocking agents, silicones, flame-proofing agents or fungistatic and/or bacteriostatic substances.

Suitable fillers are, for example, fibrous materials (i.e. any of the fibrous reinforcing materials known as such), including for example glass fibers, graphite fibers and asbestos fibers or fibrous materials emanating from an organic polymer, for example, from a polyester (such as polyethylene terephthalate) or preferably aromatic polyamides (such as m-phenylene/isophthalic acid polyamide or poly-p-phenylene terephthalamide), or even polycaprolactam. These fibrous materials may be present in the form of mats, tows, continuous fibers, nonwovens, cloths or random staple fiber mixtures. Glass fibers sized to give them an affinity for polyurethanes are preferred. The quantity of filler to be incorporated depends upon the desired improvement in the mechanical properties, the fillers generally being used in quantities of from 5 to 60% by weight, expressed as fibrous material.

Where cellular polyurethanes are to be produced by the process according to the invention, water or readily volatile organic compounds are used, alone or in combination, as blowing agents. Suitable organic blowing agents are, for example, acetone; ethyl acetate; methanol; ethanol: halogen-substituted alkanes, such as methylene chloride, chloroform, ethylidene chloride, vinylidene chloride, fluorotrichloromethane, chlorodifluoromethane, and dichlorodifluoromethane; butane; hexane: heptane; or diethyl ether.

Further examples of blowing agents and information on the use of blowing agents can be found in *Kunststoff-Handbuch,* Vol. VII, edited by Vieweg and Hochtlen, Carl Hanser Verlag, München 1966, for example on pages 108 and 109, 453 and 455, and 507 to 510.

It is also possible to use surface-active additives (emulsifiers and foam stabilizers). Suitable emulsifiers are, for example, the sodium salts of castor oil sulfonates or even of fatty acids or salts of fatty acids with amines, such as diethylamine oleate or diethanolamine stearate. Alkali or ammonium salts of sulfonic acids, for example, dodecylbenzenesulfonic acid or dinaphthylmethanedisulfonic acid, or even of fatty acids, such as ricinoleic acid, or of polymeric fatty acids may also be used as surface-active additives.

Suitable foam stabilizers are, above all, water-soluble polyether siloxanes. The structure of these compounds is generally such that a copolymer of ethylene oxide and propylene oxide is attached to a polydimethyl siloxane residue. Foam stabilizers such as these are described, for example, in U.S. Pat. No. 2,764,565.

It is also possible to use, alone or in combination, reaction retarders, for example, acid-reacting substances such as hydrochloric acid, organic acid halides or organic acids; cell regulators known per se, such as paraffins or fatty alcohols or dimethyl polysiloxanes: pigments or dyes and flame proofing agents known per se, for example trischloroethyl phosphate or ammonium phosphate or polyphosphate; stabilizers against the effects of ageing and weather: plasticizers; or fungistatic and bacteriostatic substances.

Further examples of surface-active additives and foam stabilizers, cell regulators, reaction retarders, stabilizers, flame proofing agents, plasticizers, dyes and fillers, fungistatic and bacteriostatic agents optionally used in accordance with the invention (as well as information on the use of these additives and the way in which they work) can be found in *Kunststoff-Handbuch*, Vol. VII, edited by Vieweg and Hochtlen, Carl Hanser Verlag, München 1966, for example on pages 103 to 113, and in DE-OS Nos. 2,854,384 and 2,920,501.

The reactive PU mixtures obtained may be applied by casting, knife-coating or spread-coating at room temperature, depending on the viscosity and melting behavior of the starting components. These reactive mixtures are suspensions of a solid polyisocyanate stabilized by coating with polyadduct in the polyol and optionally polyamine component. These mixtures are hardened under the influence of heat. The processing of the systems according to the invention is determined by their nature. Thixotropicized systems may be applied, for example, by hand or by a suitable extrusion or conveying system (for example by a cartridge or by a coating knife) onto any desired substrate. Examples of such substrates include bare or precoated sheets of metals (such as iron, aluminum, zinc, nickel, chromium, copper or other metals or alloys thereof); plastic components: various technical articles of metal, glass, ceramics or plastics or even textile substrates, for example in the form of nonwovens, knitted and woven fabrics, leather (skiver), matrices (for example, suede leather-silicone matrices) or intermediate supports (for example, release papers). Such thixotropicized systems may be applied to substrates to form coatings or finishes and may be hardened at elevated temperature, optionally after further handling or technical processing steps. Liquid systems castable at room temperature may be applied by casting.

The system may also be processed by centrifugal casting. Hollow bodies may be produced by introduction of the reactive mixture into molds which are then suitably rotated to spread the mixture over the surface.

Where blowing agents are used, it is possible to produce cellular polyurethanes optionally having an integral density structure.

Surface coatings, impression molds or moldings may also be produced by dip techniques.

The invention is further illustrated but is not intended to be limited by the following examples. All parts and percentages are by weight unless otherwise specified.

EXAMPLES

EXAMPLE 1

Production of a sealing compound based on a polyether diol

Preparation of the OH-prepolymer:

0.01 part lead octanoate (Octasoligen Pb 24, a product of Borchers, Goslar) is added to 100 parts by weight of a polyoxyalkylene ether diol (molecular weight 4000) derived from 80% by weight propylene oxide and 20% by weight ethylene oxide. 0.8 part dimeric 2,4-diisocyanatotoluene (Desmodur ® TT, a product of Bayer AG, West Germany, hereinafter referred to in short as "TT"), is then added, followed by heating for 1 hour at 100° C. 1.9 parts of a mixture of 65% 2,4- and 35% 2,5-diisocyanatotoluene are then added, followed by heating for another hour at 100° C. 0.4 part isophorone diisocyanate is then added, followed by heating for another hour at 100° C. The OH-prepolymer thus formed has a viscosity after cooling to 22° C. of 55,000 mPa.s.

Preparation of TT paste (A):

Using intensive stirring for 1 minute at 1800 r.p.m., 13.2 parts powder-form TT are uniformly suspended in a mixture of 20 parts of the OH prepolymer of Example 1, 4.0 parts 2,4- (35% 2,6)-diamino-3,5-diethyltoluene and 0.14 parts 4,4'-diamino-3,3'-dimethyldicyclohexylmethane. After degassing for 30 minutes in a water jet vacuum at 50° C., a free-flowing, storable TT paste having a thickening temperature (without further additives) of 72° C. is obtained.

Preparation of filled polyol component (B):

The following components are successively mixed using a high-speed stirrer (dissolver disc at 4000 r.p.m.) and the resulting mixture degassed in a water jet vacuum for 30 minutes at 50° C.: 80 parts of the OH-prepolymer of Example 1, 6 parts pyrogenic silica (Cab-o-Sil M5, a product of Cabot Corporation, Hanau, 100 parts potassium aluminosilicate having a pore diameter of 3 Å (Baylith L, a product of Bayer AG, West Germany), 100 parts heavy spar (EWO 423N, a product of Sachtleben, Duisburg) and 1.0 part lead octanoate. A highly pasty mixture is obtained.

Preparation of ready-to-use sealing compound:

37.34 parts of TT paste (A) of Example 1 are mixed while degassing in a planetary mixer with 95 parts of the filler paste (B) of Example 1. A readily processible, storable sealing compound is obtained in the form of a firm, non-running paste which adheres firmly to solid substrates and has a thickening temperature of 62° C.

A test specimen hardened for 30 minutes at 120° C. has the following mechanical properties:

| | |
|---|---|
| Shore A hardness | 81 |
| Elongation at break | 500% |
| Tensile strength | 4.9 MPa |
| Tear propagation resistance | 16 kN/m |
| Resilience | 44% |

EXAMPLE 2

Production of a sealing compound based on a polyether triol

Preparation of the OH-prepolymer:

2.0 parts diethylenetriamine and 5.07 parts 2,4-diisocyanatotoluene are successively added with vigorous stirring to 100 parts of a trimethylolpropane-started polyoxyalkylene ether triol (molecular weight 6000) containing 83% by weight propylene oxide and 17% by weight ethylene oxide. Moderate stirring is then continued for 30 minutes at 100° C. After addition of 0.01 part lead octanoate, the mixture is stirred for another 30 minutes at 100° C. and a vacuum applied for degassing. 1.5 parts isophorone diisocyanate and another 0.01 part lead octanoate are then added, followed by stirring with degassing for another hour at 100° C. A thixotropicized OH-prepolymer having a viscosity of approximately 40,000 mPa.s is obtained.

Preparation of TT paste (A):

16.31 parts powder-form TT are uniformly suspended by intensive stirring (for 1 minute at 1800 r.p.m.) in a mixture of 15.09 parts of the polyoxyalkylene ether triol just described, 3.0 parts 2,4- (35% 2,6)-diamino-3,5-diethyltoluene and 0.4 part 4,4'-diamino-3,3'-dimethyldicyclohexylmethane. After degassing for 30 minutes at 50° C., a chemically completely storable TT paste having a viscosity of 30,000 mPa.s and a thickening temperature of 108° C. is obtained.

Preparation of filled polyol component (B):

The following components are successively mixed using a high speed stirrer (dissolver disc at 4000 r.p.m.) and the resulting mixture degassed in a water jet vacuum for 30 minutes: 84.91 parts of the OH-prepolymer of Example 2, 8 parts potassium aluminosilicate having a pore diameter of 3Å (Baylith L, a product of Bayer AG, West Germany), 100 parts heavy spar (EWO 423N, a product of Sachtleben, Duisburg) and 1.2 parts lead octanoate. A highly pasty mixture is obtained.

Production of ready-to-use sealing compound:

34.8 parts of TT paste (A) of Example 2 are mixed while degassing in a planetary mixer with 194.11 parts of the filler paste (B) of Example 2 to form a readily processible, storable sealing compound in the form of a firm non-running paste which adheres firmly to solid substrates and has a thickening temperature of 80° C. A test specimen hardened for 30 minutes at 120° C. has the following mechanical properties:

| Shore A hardness | 84 |
| --- | --- |
| Elongation at break | 100% |
| Tensile strength | 4.2 MPa |
| Tear propagation resistance | 9.5 kN/m |
| Resilience | 46% |

EXAMPLE 3

Production of a sealing compound based on an aromatic polyether diamine

Preparation of TT paste (A).

In a twin-screw mixer (screws rotating in the same direction), 17.7 parts TT are incorporated in a mixture of 22.77 parts of an aromatic polyether diamine based on a polyoxypropylene ether diol (molecular weight 2000) and 2,4-tolylene diisocyanate prepared in accordance with DE-OS No. 2,948,419 (molecular weight 2296, viscosity 11,000 mPa.s) and 0.44 part 4,4'-diamino-3,3'-dimethyldicyclohexylmethane. A slightly thixotropic, chemically stable, non-sedimenting TT paste having a thickening temperature of 98° C. and a viscosity of 120,000 mPa.s is obtained.

Preparation of filled polyamine component (B):

The following components are successively mixed using a high-speed stirrer (dissolver disc at 4000 r.p.m.) and the resulting mixture degassed in a water jet vacuum for 30 minutes at 50° C.: 77.23 parts of the polyether diamine just described, 8 parts potassium aluminosilicate having a pore diameter of 3Å (Baylith L, a product of Bayer AG, West Germany), 84 parts heavy spar (EWO 423 N, a product of Sachtleben, Duisburg and, if required, up to 12 parts pyrogenic silica (Cab-o-Sil M5, a product of Cabot Corporation, Hanau).

Production of ready-to-use sealing compound:

40.91 parts of the TT past (A) of Example 3 are mixed with 169.23 parts of the filled polyamine component (B) of Example 3 (without pyrogenic silica) while degassing in a planetary mixer to form a readily processible sealing compound which adheres firmly to solid substrates and shows good temperature stability. The sealing compound has a thickening temperature of 78° C. and a viscosity without pyrogenic silica of 60,000 mPas. A test specimen hardened at 120° C. has the following mechanical properties:

|  | Tempering: 8 hr at 120° C. | 8 hr at 120° C. + 1 hr at 180° C. |
| --- | --- | --- |
| Shore hardness A | 97 | 95 |
| Breaking elongation | 500% | 300% |
| Tensile strength | 11.4 MPa | 10.7 MPa |
| Tear propagation resistance | 40 kN/m | 32 kN/m |
| Resilience | 54% | 53% |

EXAMPLE 4

Production of a polyester-based casting compound

Production of granulate (A):

1.5 parts 4,4'-diamino-3,3'-dimethyldicyclohexylmethane and 90 parts powder-form 3,3'-diisocyanato-4,4'-dimethyldiphenylure are sequentially added to 100 parts of a melt (heated to 60° C.) of a difunctional polyester of adipic acid and ethylene glycol having a molecular weight of 2000. The suspension (melt) is homogeneously mixed by means of a suitable stirrer (high-speed stirrer at 1800 r.p.m.). The mixture is degassed in a water jet vacuum for 30 minutes at 50° C. The melt is then cast onto a cold plate. After cooling, the mixtures are mechanically reduced in size to a granulate. The granulates thus obtained are storable at room temperature and may be reacted at any time with NCO-reactive compounds.

Production of ready-to-use casting compound for the production of moldings:

95 parts of the granulate (A) described above are added with stirring at 80° C. to 200 parts of a polyester containing terminal aromatic $NH_2$ groups and having a molecular weight of 2490 (component B) that is prepared by alkaline hydrolysis of an NCO prepolymer of 1 mole of the above-mentioned polyester and 2 moles 2,4-diisocyanatotoluene in accordance with DE-OS No. 2,948,419. The mixture, which becomes completely liquid in a short time, is degassed for another 10 minutes at 60° C. The final mixture has a viscosity at 80° C. of 5000 mPa.s. Accordingly, it may readily be processed by casting. There is no limit on the processing time because the mixture is chemically stable at temperatures of up to 90° C.; i.e. there is no increase in viscosity. A high-quality PUR elastomer is obtained when the mixture is cast into a mold coated with a standard silicone release agent and heated at 100° C. and the mold is then heated to 150° C. After 1 hour, the molding is removed from the mold and tempered for 4 hours at 150° C.

The elastomer shows outstanding mechanical properties:

| Shore A hardness | 94 |
| --- | --- |
| Elongation at break | 650% |
| Tensile strength | 42 MPa |
| Tear propagation resistance | 78 kN/m |
| 100% modulus | 10 MPa |
| Resilience | 37% |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of storable reactive polyurethane-polyurea compositions that harden at elevated temperature, comprising:
(a) preparing separately
  (A) a solid polyisocyanate composition stabilized by coating with a polyadduct formed by reaction at the polyisocyanate surface with aliphatic polyamines, hydrazines or hydrazide compounds having molecular weights of 32 to 399, wherein the polyisocyanate composition is suspended in one or more polyols having molecular weights of from 62 to 8000, aromatic polyamines having molecular weights of from 108 to 8000, or aliphatic polyamines having molecular weights of from 400 to 8000, such that the polyisocyanate composition contains an excess of reactable NCO groups in relation to NCO-reactive groups, and
  (B) a polyol and/or polyamine mixture, optionally containing fillers and other auxiliaries and additives, which provides the remainder of the stoichiometrically necessary OH and NH$_2$ equivalents; and
(b) mixing components (A) and (B) together just before the intended use at temperatures below the thickening temperature of the final reaction mixture to form the final reactive polyurethane-polyurea composition.

2. A process according to claim 1 wherein component (A) and (B) are mixed together at a temperature from about 0° to 50° C.

3. A process according to claim 1 wherein component (A) is storable at a maximum temperature of about 70° to 130° C. and is optionally crystallized at room temperature.

4. A process according to claim 1 wherein component (A) is a suspension of a stabilized dimeric tolylene diisocyanate or of a stabilized 3,3'-diisocyanato-4, 4'-dimethyl-N,N'-diphenylurea.

5. A process according to claim 1 wherein component (B) additionally contains mineral fillers.

6. A process according to claim 5 wherein the mineral fillers are selected from the group consisting of heavy spar, chalk, zeolites, and finely divided silica.

7. A process according to claim 1 wherein components (A) and (B) are used in such quantities that an isocyanate index of 50 to 200 is maintained.

8. A process according to claim 7 wherein an isocyanate index of 90 to 135 is maintained.

9. A process according to claim 1 comprising
(a) preparing separately (A) a solid stabilized dimeric tolylene diisocyanate or stabilized 3,3'-diisocyanato-4, 4'-dimethyl-N,N'-diphenylurea suspended in one or more polyols having molecular weights of from 62 to 8000, aromatic polyamines having molecular weights of from 108 to 8000, or aliphatic polyamines having molecular weights of from 400 to 8000, such that the composition contains an excess of reactable NCO groups in relation to NCO-reactive groups, and
(B) a polyol and/or polyamine mixture, optionally containing fillers and other auxiliaries and additives, which provides the remainder of the stoichiometrically necessary OH and NH$_2$ equivalents; and
(b) mixing components (A) and (B) together just before the intended use at temperatures of from about 0° to 50° C. and using such quantities of components (A) and (B) that an isocyanate index of 90 to 135 is maintained.

* * * * *